United States Patent Office 3,192,461
Patented June 29, 1965

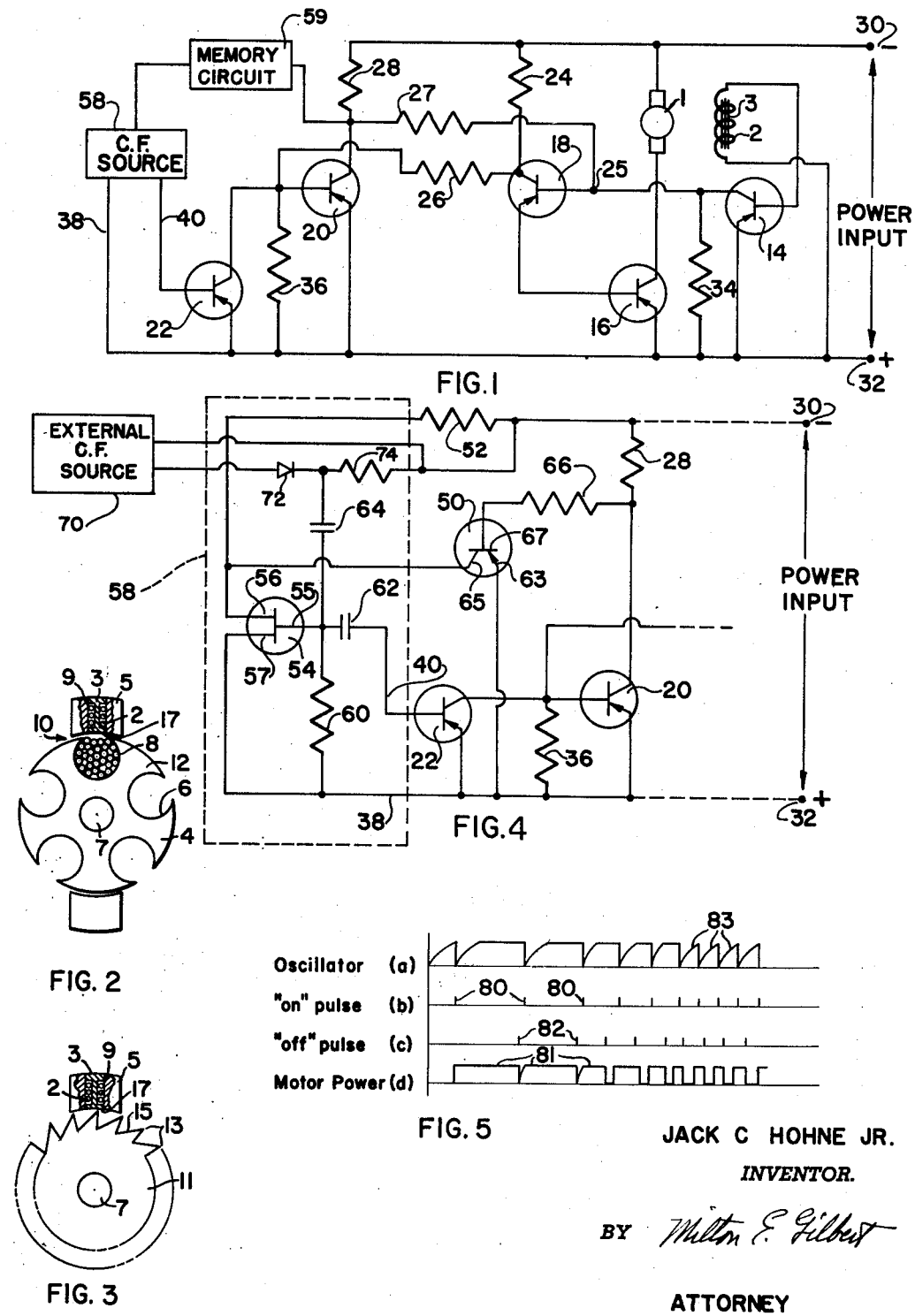

3,192,461
PULSE FED MOTOR SYSTEM INCLUDING MEMORY CIRCUIT
Jack C. Hohne, Jr., Tipp City, Ohio, assignor to Globe Industries, Inc., Dayton, Ohio, a corporation of Ohio
Continuation of application Ser. No. 738,776, May 29, 1958. This application Aug. 20, 1962, Ser. No. 221,651
6 Claims. (Cl. 318—318)

This invention relates to a control for a motor or other transducer. The invention is more particularly concerned with an arrangement for controlling the velocity of a linear or rotary motion, where a controllable source of energy is used to power the transducer. This application is a continuation of my prior U.S. application Serial No. 738,776 filed on May 29, 1958, now abandoned.

In the case of an electric motor, various types of mechanical governors have been used to maintain the speed of the motor within the desired limits. In these devices, switches are moved, usually by centrifugal force acting on springs, and various means are employed for holding the springs in position, etc. In all of these devices, the spring, the means for holding them in position, etc., are all subject to undesired movement; so that the governed speed may be dependent upon temperature changes and other changes due to vibration or acceleration forces to which the unit is subjected. In such mechanical governor type units, the various variables which must be taken into account in their design do not all vary uniformly, so that they cannot all be readily compensated for when designing such units. Therefore, some of these variables are never compensated for, and it is usually considered to be an achievement to design such a device which will maintain a desired speed within a 1% error if the device is subjected to extreme variations of operation conditions. Also, when it is desired to compensate the unit for temperature errors, and the governor is to be applied to small motors, there results a sizable addition to the unit merely to endeavor to compensate for this error. As a result, in attempting to compensate for known variations, very many additional elements are added which complicate the unit and which introduce additional errors, so that eventually in endeavoring to compensate for several errors the device becomes impractical to construct.

Other methods proposed for controlling the speed or motion of a mechanism are based upon electrical and/or electronic systems. Such schemes may be based upon generating a D.C. voltage or an A.C. voltage by a sensing device (e.g., tachometer generator) attached to the motor, whose amplitude varies with the speed of the motor; and the variation in that amplitude from a preselected value is used to apply a correction signal through an appropriate amplifier to speed up or slow down the motor. One of the difficulties with such an electrical or electronic system is that when operating the motor near the desired speed, the voltage signal will be near the desired value; and what must then be measured is a small percentage of that value (e.g., .1 of 1%). Since the original or primary signal will tend to mask out the .1% error signal, it is thus more difficult to measure small increments of change. Assuming that such small increments of change are to be measured, the measuring device which is employed (usually a comparing or amplifying device) responds to amplitude variations introduced by itself which may be caused by ambient temperature (input) voltage variations, external mechanical forces such as acceleration, vibration, etc. Thus it is difficult to build such arrangements capable of maintaining speed regulation of greater than 1 or 2%. The size and additional power requirements of such devices are considerable when compared to the motor being controlled; and regardless of complexity, they cannot eliminate errors introduced by variations in the tachometer generator due to other than speed changes.

It is one object of the invention to provide a speed regulation system that is capable of holding speed to the order of .1% regulation. It is another object of the invention to provide a speed regulation system which is substantially insensitive to ambient conditions to which the unit is subjected. Still another object of the invention is to provide a speed regulating system which will not occupy a large volume as compared to the device it regulates. A further object of the invention is to provide a speed regulating system which operates from the customary power source provided for the motor and which requires no additional power. These and other advantages will become more readily apparent upon a reading of the description following hereinafter, and upon an examination of the drawings, in which:

FIGURE 1 is a schematic diagram of the speed control system of the invention,

FIGURE 2 is a partial cross-sectional view through the armature and field pole of a motor indicating the frequency sensing means, FIGURE 3 is a view similar to FIGURE 2 but illustrating another embodiment of a frequency sensing means, FIGURE 4 is a schematic representation of one form of a memory circuit and standard frequency source, and FIGURE 5 is a waveform timing diagram for assistance in illustrating the functioning of the preferred circuits.

The invention provides a speed regulation system that is capable of holding speed exactly synchronous with a reference frequency while requiring an insignificant amount of power from this reference source as compared with the power required to drive the motor, even if the motor power requirement is in the order of milliwatts.

In the simplest form of the application of the invention to regulating the speed of either a linear or rotary motion, a switch could be used which would be closed by a pulse generated by a constant frequency source (an "on pulse"). This switch energizes the prime mover, which is arranged to produce a feedback pulsed signal whose frequency is equal to the constant frequency source, when operating at the desired speed. This feedback pulsed signal operates to open the switch (an "off pulse"). A "memory circuit" is provided to either disable the "off pulse" or else immediately close the switch if the "off pulse" does not occur until after another "on pulse" occurs or would have occurred. The failure of an "off pulse" to occur following an "on pulse" indicates that the device is operating below the desired speed. Continuous or substantially continuous power is thus applied (by the operation of this "memory circuit") to the prime mover of the system to cause it to accelerate in speed. This process continues with the unit accelerating until it reaches the desired speed, at which time an "off pulse" will be generated, discontinuing operation of the "memory circuit," and interrupting the flow of power to the prime mover. Acceleration will then cease until the next "on pulse" which restores power. With the device at or near the desired speed, the next "off pulse" will occur before the "memory circuit" functions. This on-off pulsing will then continue to maintain the device operating at the desired speed, since any tendency to slow down results in longer "on time" and shorter "off time"; i.e., higher speeds. Conversely, any tendency to increase speed causes shorter "on" periods and longer "off" periods, thus counteracting any increase in speed. The net result is that the power input to the prime mover of the device consists of a series of pulses of power, whose frequency at pre-set speed is self-regulated by the feedback pulses to that value necessary to maintain the desired speed. Since the "on pulses" and the "off pulses" remain at the same frequency when the motor is operating at its pre-set speed, the driven device runs exactly synchronous with the constant frequency source, and no error in frequency exists to apply any correction signal to the prime mover of the driven device. Since the speed control uses pulses whose amplitude, duration or wave shape are unimportant, any variation (other than in frequency) which may be caused by the many variable conditions imposed on the system will introduce no error in the system.

In the application of this invention to an electric motor, in place of a conventional switch a bi-stable transistor switching circuit is used, which is triggered to one stable state (motor power on) by a standard frequency source and triggered to another stable state (motor power off) by a pulse obtained from the motor. In a preferred embodiment a pulse is obtained from the motor by simply using the magnetic field already existing in a D.C. motor, by providing a coil and supplementary pole in the motor pole piece which will produce a voltage pulse each time a slot in the armature lamination passes under the supplementary pole. In another form of the invention a wheel or washer may be mounted on the armature shaft, having a series of teeth on it, and a similar coil located juxtaposed to the wheel and arranged to count the speed of the armature shaft by producing a frequency which is a measure of this speed. During operation of the motor, it accelerates to the desired speed because of the "memory circuit" and as a variation of input voltage, load, or any other condition affecting the motor occurs, the time interval between the "on" and "off" pulses varies to allow more or less power to the motor. Thus, using the system of the invention, if the motor is operating such that it requires only 10% of the available power, the motor will be turned on only 10% of the time and off 90% of the time; and conversely, if it requires 90% of the power, it will be on 90% of the time and off 10% of the time. In employing a transistor bi-stable circuit in the system of the invention, it was found preferable to isolate the motor from the flip-flop circuit. This was done in order to prevent variation in motor speeds from changing the steady state condition of the unit, i.e., variation in the motor speed could introduce pulses which tend to make the unit turn on or off independently of the frequency sensing means.

Referring now to the drawings, FIGURE 1 shows the control system of the invention as applied to regulating the speed of a load 1. As above indicated, this load could be a motor or any type of device having either rotational or linear movement. The system endeavors to simulate the corrective action that would be attained from a mechanical (centrifugal type) switch such as now widely used. In such a switch or governor, reeds are used which are opened and closed at a very high frequency due to centrifugal action. This frequency is high compared to the motor speed, and the net resultant power applied to the motor depends upon the total closure time of a number of closures of the reeds per unit time. The correction is applied by a variation in the on-time as compared to the off-time, i.e., the make and break time variation. The present invention accomplishes an elimination in the variation of the "on-off" frequency that is obtained by a centrifugal source 58. This constant frequency source 58 may be a sine wave or pulse type generator, and each appropriate change in voltage of either the sine wave or the pulse type generator turns the motor on, i.e., applies full power to the motor; and thereafter a frequency sensing device on the motor will transmit a pulse or alternating frequency which will turn full power off to the motor, as above described.

FIGURE 2 indicates the details of a frequency sensing means employing a coil as a signal frequency generator. A small coil 2 is wound upon a core 3 of magnetic material which may assume the form of a small nail which is embedded into hole 9 drilled in a pole piece 5 of a motor. The coil 2 and core 3 are retained in position by a washer 15. The pole piece 5 is juxtaposed to the laminations 4 of a motor armature. The laminations 4 are mounted upon an armature shaft 7 and are so formed that when the laminations are stacked on the shaft 7 a series of long slots 6 will be formed. Wound within the slots are a series of stranded coils 8. The core 3 is of magnetic material and may be shaped like a nail as indicated in the drawings, the head of the nail being larger in diameter than the shank of the nail. The coil 2 is wrapped around the core 3 and arranged with the small end of the core 3 extending towards the armature. The magnetic field present in the pole piece, passes through the core 3, down the small diameter of it, across the air gap 10, and into the laminations 4. When a slot 6 passes under the core 3 of coil 2, the magnetic reluctance of the flux path is greatly increased. Therefore, the magnitude of the flux flowing through the core 3 decreases and this change in the flux through that core generates a voltage in the coil, the frequency of which is determined by the motor speed. At high motor speeds there is obtained a generated or induced voltage approaching the sine wave. The form of the voltage output of coil 2 may be determined by the geometry of the core, i.e., the diameter of the coil 4, the size of the slot and the laminations. Thus, a pulse is generated each time a slot 6 passes beneath the coil 2. As a result, the frequency of these pulses depends on the speed of rotation of the armature 4. Instead of employing the armature laminations themselves, another arrangement is illustrated in FIGURE 3, wherein a disc 11 is employed, mounted upon the armature shaft 7. The disc 11 has a series of teeth 13 formed thereon, and when the grooves or spaces 15 between the teeth 13 pass beneath the coil 2 a voltage pulse is generated similar to that described in connection with FIGURE 2.

Thus, the standard frequency source 58 turns the motor on, and the motor is accelerated until a slot 6 in the lamination passes underneath coil 2, at which time a pulse is obtained which is fed back into the network described hereinafter which then turns the motor off. The motor will then stay off until the next standard frequency pulse turns it on again. The standard frequency is so adjusted or pre-set that the frequency at which it operates corresponds to the correct number of armature revolutions desired, i.e., the predetermined speed desired. In practice, a sufficiently high frequency is selected for the standard frequency source, so that the motor speed stays reasonably constant. The duration of the "on time" is then short enough so that the actual angular acceleration of the armature is relatively low. Also, the "off time" is relatively short enough, so that the deceleration is very low. The result is a constant average speed and substantially constant angular rate of rotation.

The control network comprises a series of transistors arranged in a bi-stable circuit, which can be turned on and remain on until the next pulse of the proper polarity turns them off, and then they remain off until the next pulse of proper polarity turns them on again. This flip-flop or bi-stable circuit acts as a latching relay but operates at a very high frequency as compared to that obtained from a mechanical type of relay. Power is applied to the terminals 30, 32, which may be obtained from an A.C. or D.C. source. In the embodiment illustrated a D.C. input is used and the polarity is indicated in FIGURE 1. The polarity indicated would be used where transistors are employed of the PNP type; whereas if transistors of the NPN type were employed, then the reverse polarity would be used. When power is applied at the input terminals 30 and 32, and if the motor is off, then the power transistor 16 which controls current flow to the motor is not conducting. The transistor 16 then functions as on-off switch. If transistor 16 is not conducting, then transistor 18 is also not conducting, so that transistor 20 must be conducting. Assuming the transistors are operated at saturation, then transistor 20 operates essentially as a closed switch from the emitter to the collector, so that the voltage at the collector is nearly the same as the value of the voltage applied to the terminal 32. In this event the voltage across the series combination of resistors 27 and 34 is substantially zero, both being effectively connected to the plus power lead 32. Therefore, the junction point 25 is also almost at terminal 32 potential. This maintains transistors 16 and 18 off.

When a negative pulse is applied to the base of transistor 22 from the constant frequency source 58, then transistor 22 will conduct and act as a switch. When that "switch" closes, the base of transistor 20 will be connected to the plus power lead 32 so that the base and emitter of transistor 20 are at the same potential. When this occurs, then transistor 20 will be turned off. When transistor 20 is turned off, then the plus power will be permitted to flow through the series combination of resistor 34, resistor 27, and resistor 28 to the minus power terminal 30. Because of this division of voltage, the base of transistor 18 which is located at the junction 25 of resistors 34 and 27 will be minus with respect to the plus terminal 32. Since the base of transistor 18 is negative with respect to its emitter potential, transistor 18 will conduct. The current flow from the emitter of transistor 18 also flows through the emitter to base circuit of transistor 16 which also turns transistor 16 on. The circuit remains stable in this condition; because when transistors 16 and 18 are both conducting, the potential at the collector of transistor 18 is substantially the same as the potential at terminal 32. Therefore, the base of transistor 20 which is connected to the junction 31 of resistors 26 and 36 is also at nearly plus terminal 32 voltage, so that transistor 20 does not conduct. The system will then remain stable in that condition with the motor on and with power transistors 16 and 18 turned on.

This flip-flop or bi-stable circuit comprises resistors 24, 28, 26, 27, 34 and 36 together with transistors 16, 18 and 20. Transistor 16 is employed in order to isolate the inductive voltages obtained from the load 1, i.e., it isolates the load 1 from the flip-flop circuit so that it does not inadvertently trigger the circuit from one stable state to the other stable state.

In operation, with power applied to the load 1, the motion of the load will accelerate until a voltage is induced in coil 2. This voltage from coil 2 is then applied to the base of transistor 14. When the base of transistor 14 is minus with respect to the plus power line, then transistor 14 conducts. Transistor 14 also operates as a low resistance switch from the plus power lead 32 to the base of transistor 18. This means that the base and emitter of transistor 18 are then connected to the same voltage and no current can flow, so that transistor 18 then stops conducting and turns off. When transistor 18 stops conducting, then transistor 16 will also turn off and the current to the load 1 will be discontinued. Transistor 20 will start conducting as soon as transistor 18 is turned off, because the current flow through resistors 24, 26 and 36 causes the base to become negative with respect to the emitter and the flip-flop circuit is then stable in the opposite condition with the power to load 1 off. The flip-flop circuit will remain in this condition until another minus pulse is applied to the base of transistor 22, and the operation described above will be repeated. It is readily understood that this reversal from one stable condition to the other of the flip-flop circuit occurs at a comparatively high speed. For example, if the load 1 is a motor, and it is desired to be governed at a speed of 12,000 r.p.m., and the arrangement of FIGURE 2 is used with a five slot armature, then 60,000 pulses per minute or 1,000 pulses per second will be produced. Thus, the standard frequency source will be so selected as to also produce one thousand pulses per second; and the total time from on to off and back to on again will occur in one millisecond.

The essential portions of the network disclosed in FIGURE 1 consists of the flip-flop circuit, as described above, and the additional transistors to isolate various other components of the network from the flip-flop circuit. The transistor 16 isolates the load 1 from the flip-flop circuit, as described above; transistor 14 isolates the pick-up coil 2 from the flip-flop circuit; and transistor 22 isolates the constant frequency source from the flip-flop circuit.

FIGURE 4 indicates one embodiment of a standard frequency source that might be used, and also includes the "memory circuit" 59 that insures against synchronizing at an undesired harmonic of the desired frequencies. The "memory circuit" 59 shown in FIGURE 4 comprises the transistor 50, resistor 66 and resistor 52. The transistor 50 operates to blank out the constant frequency pulses unless the load is operating at the correct speed. The remaining portion of the circuit of FIGURE 4, which has been omitted, corresponds to the similarly numbered elements shown in FIGURE 1.

Transistor 54 has two bases 56 and 57, and an emitter 55. Such a transistor is characterized as a uni-junction transistor. This transistor 54 operates similar to a thyratron. As indicated in FIGURE 4, plus voltage is applied to base 57 and minus voltage is applied to base 56 through resistor 52. The characteristic of transistors such as 54 is that as long as the voltage at the emitter 55 does not exceed approximately .6 or .7 of the voltage applied to the two bases, then no current will flow through the emitter 55. As soon as the voltage at emitter 55 exceeds that limit, then current will flow and transistor 54 becomes a low impedance device from emitter 55 to base 56. As long as current flow is maintained, then transistor 54 will continue to conduct and remain in that condition of operation until the current flow is interrupted. Once the current flow through transistor 54 ceases, the transistor will again remain non-conductive from emitter 55 to base 56 until the voltage at emitter 55 exceeds the ratio previously obtained.

Cacapitor 64 is charged through the resistor 60. When the voltage at the emitter 55 exceeds the breakdown voltage limit of the transistor 54, then the condenser 64 will discharge through the emitter 55 and base 56 until the current flow ceases, i.e., the capacitor is discharged and then current flow through resistor 60 is not sufficient to maintain conduction through transistor 54. When the condenser 64 has discharged, the voltage will again begin to build up until it reaches the breakdown point once again. The cyclic operation of condenser 64 will continue so that an output of transistor 54 is obtained which may assume any desired pattern depending upon the value of the component selected. Condenser 62 is a coupling condenser to connect the pulses from the transistor 54 to the flip-flop circuit previously described. As indicated in FIGURE 4, leads 38 and 40 correspond to leads 38 and 40 shown in FIGURE 1. As capacitor 64 discharges, a current will flow through capacitor 62 which turns transistor 22 on and in turn turns transistor 20 off. Resistor 60 serves to determine the speed with which the capacitor 64 is charged up. By varying the value of resistor 60, the frequency with which the output voltage of transistor 54 is repeated can be varied. The same effect can be obtained by varying the value of capacitor 64. The constant frequency source 58 therefore consists essentially of elements 64, 54, 60 and 62. This portion of the circuitry has been separated by dotted lines in FIGURE 4 and indicated by reference numeral 58.

The "memory circuit" 59 controls the frequency source 58 and acts to stabilize the operation of the network, i.e., to keep it from synchronizing at odd multiples or sub-multiples. The transistor 50 is connected so that the emitter is connected to the plus power lead 32, and the collector 65 is connected to the base 56 of transistor 54. The base 67 of transistor 50 is connected through a resistor 66 to the collector of transistor 20.

As indicated above, when the motor or load 1 is operating, transistor 20 is turned off. This means that there is no current flow through the emitter to collector of transistor 20, so that the voltage at the collector of transistor 20 is considerably negative with respect to the plus power lead 32. When this occurs, there is current flow from plus power lead 32 through emitter 63 of transistor 50, through base 67, and from base 67 through resistor 66, due to the difference of potential between emitter 63 and base 67. When current flows from emitter 63 to base 67, there is a low impedance or low resistance from the emitter 63 to collector 65 of transistor 50. Due to this low resistance, the base 56 of the transistor 54 is effectively connected to the plus power lead 32, so that there is no voltage potential across the two bases 56 and 57 of transistor 54. Since there is no potential difference between the bases 56 and 57, the capacitor 64 cannot discharge through the transistor 54. Consequently the capacitor 64 is allowed to be charged to assume full voltage through resistor 60 if this condition remains for a sufficient time. The capacitor 64 will remain charged until a pulse from the feedback coil 2 turns the motor off; and when the motor is turned off, then transistor 20 will conduct. The collector of transistor 20 will then for all practical purposes be at terminal 32 potential and there will then no longer be any voltage difference to allow current flow through emitter 63 and out base 67 of transistor 50, thus rendering transistor 50 non-conductive. Since there is no current flowing from the emitter to the base of transistor 50, the impedance from the emitter to the collector of transistor 50 is very high to remove the short circuit across the unijunction transistor 54, so that base 56 is again effectively connected to the minus power line through resistor 52. When that happens there again exists a voltage potential across bases 56 and 57 of transistor 54, and capacitor 64 can again discharge and create a pulse which will turn the motor on.

When a pulse from the discharge of capacitor 64 turns the motor on, it takes a finite amount of time before capacitor 64 is again charged up to the point where it can again be discharged and produce another pulse. If, in the meantime, a pulse from the coil 2 operates to turn the motor off, capacitor 64 will discharge at the correct period of time depending upon the time constant of the R-C network 60, 64, and turn the motor back on again. If, on the other hand, the motor is operating too slow and capacitor 64 is permitted to charge up to its discharge point, i.e., the normal discharge point, before the motor turns off again, then the instant the motor is turned off it is turned back on again by this discharge.

As shown in FIGURE 5c when the motor is at standstill and the circuit is initially energized, the motor receives pulses of energy for a long period of time; then it will be off for a few microseconds, and then on again for a long period of time. The motor will thus progressively accelerate or increase in speed until one of the feedback off pulses occurs before capacitor 64 can discharge. At that time the motor will remain off long enough for capacitor 64 to charge again to its proper value so that it can then discharge to turn the motor on. At this time there exists synchronism between the motor speed and the pre-set frequency of the constant frequency source.

An additional advantage of the arrangement shown in FIGURE 4 is that the saw tooth oscillator 58 can be synchronized with still another set of pulses. An input pulse may be connected to any of the elements 55, 56, or 57 of transistor 54 in order to cause the condenser 64 to discharge at any desired time. For example, a crystal oscillator or other external constant frequency source 70 may be connected as shown paralleling resistor 74 and in series with diode 72 which serves to isolate the constant frequency source 70 from the source 58. Resistor 74 serves to assure a reasonably high impedance input from the source 70. The employment of the additional source 70 results in greater speed accuracy and requires less power. In this manner an even more stable constant frequency source can be used to control the output of the oscillator 58.

Briefly recapitulating the operation of the circuit as described above with the assistance of the timing diagram of FIGURE 5, the relaxation oscillator 58 is initially pre-set to a given frequency corresponding to the desired speed of the motor by adjusting the time constant provided by resistor 60 and capacitor 64. When the circuit is initially energized, the first oscillator pulse 80 (FIGURE 5b) reverses the flip-flop switching means to apply an energizing pulse 81 (FIGURE 5d) to the motor. This energizing pulse 81 is continued until the next feedback pulse 82 (FIGURE 5c) is produced by the motor, which feedback pulse 82 reverses the flip-flop and deenergizes the motor. In the meantime, during the time interval of the motor energizing pulse 81, the "memory circuit" 59 functions to disable the oscillator 58 by short circuiting the unijunction transistor 54. If the time period of motor power pulse 81 is greater than the time constant of the oscillator 58, the capacitor 64 becomes fully charged during the time of pulse 81 and the oscillator is readied to produce its next pulse but cannot do so. Upon the first feedback pulse 82 being then applied to the flip-flop, the motor is thereupon deenergized and the short circuiting or disablement of the oscillator 58 is also removed. Since the capacitor 64 is charged, the oscillator 58 almost immediately produces the next pulse to again trigger the flip-flop and reapply energization to the motor. Thus until the motor 1 reaches its pre-set speed, power pulses are almost continuously applied to accelerate the motor 1 due to the fact that the frequency or time interval between the feedback pulses 82 are longer than the time constant or period of the oscillator 58. However, as the speed of the motor increases to a pre-set speed where the feedback pulses 82 are produced at a higher frequency or shorter time period almost equal to or equal to the normal period of the oscillator 58, the oscillator 58 is disabled for a shorter time period than its pre-set time constant and the memory circuit does not delay the oscillator produced pulses but permits each to be produced at the pre-set constant frequency as indicated by pulses 83 of FIGURE 5a.

Thus, the oscillator 58 effectively functions in two modes of operation. In the first mode occurring whenever the motor is rotating below a pre-set speed, the memory circuit 59 delays the oscillator produced pulses 80 until just after the feedback pulses 82 and effectively varies the phase and frequency of the oscillator 58. In the second mode of operation, occurring when the motor reaches the preset speed, the oscillator 58 functions at a constant pre-set frequency and power is applied to the motor according to the phase difference between the oscillator pulses 80 and feedback pulses 82.

Although only several preferred embodiments of the invention have been illustrated and described, various changes in the form and arrangement of the several elements will become apparent to those skilled in the art, and may be made without departing from the scope of the invention as defined in the appended claims.

What I claim is:

1. A speed control system for applying variable duration power pulses to a motor comprising: an oscillator normally producing pulses at a pre-set rate, a feedback pulse producer generating pulses at a rate corresponding to the motor speed, means for energizing said motor with power pulses having a time duration proportional to the phase difference between said successive oscillator pulses and feedback pulses and for shutting off power for the balance of time duration, a memory circuit responsive to the duration of power pulses exceeding the preset period of said oscillator for delaying the following pulse produced by said oscillator until just after the next succeeding feedback pulse is produced, thereby to controllably vary the frequency and phase of the oscillator produced pulses into synchronism with those of the feedback pulses until the motor has reached a predetermined speed related to the pre-set frequency of the oscillator.

2. In the speed control system of claim 1, said oscillator comprising a relaxation oscillator having a pre-set time period and a discharge device normally triggered into discharge after each said time period to produce said oscillator pulses, and said memory circuit being responsive during each energization of the motor to prevent discharge of said discharge device, whereby if said motor is energized for a time interval greater than said pre-set time period, the discharge of said device is prevented until just after said motor is deenergized thereby to substantially synchronize the frequency and phase of the oscillator pulses with those of the feedback pulses.

3. A motor speed control comprising: an oscillator functioning in one mode of operation to produce regularly recurring pulses at a pre-set rate, a feedback pulse producer generating pulses at a rate corresponding to motor speed, a switching means selectively energized by said oscillator and feedback pulse producer to apply power to and completely remove power from said motor, and a memory circuit for disabling said oscillator from producing pulses whenever said motor is receiving power and permitting said oscillator to renew operation whenever power is disconnected from the motor, said oscillator being conditioned when disabled by said memory circuit to produce its next regularly recurring impulse, whereby in the event that the motor receives power for a period longer than the pre-set period of said oscillator, said oscillator produces its next succeeding pulse substantially immediately after power is disconnected from the motor thereby to accelerate the motor to a pre-set speed.

4. A motor speed control comprising: an oscillator normally operating at a pre-set frequency, a feedback pulse producer generating pulses at a rate corresponding to motor speed, a switching means, and a memory circuit, said switching means being selectively energized by said pulses from said oscillator to apply power to the motor and by pulses from said feedback pulse producer to de-energize said motor by completely removing power therefrom, said memory circuit being responsive to the operation of said switching means to reduce the frequency of said oscillator when said motor is operating below a given speed determined by the normal pre-set rate of said oscillator and operating in conjunction with said oscillator to synchronize the phase thereof into synchronism with said feedback pulses thereby to apply proportionally longer periods of power to said motor until said motor attains a given speed proportional to said pre-set frequency.

5. A motor speed control incorporating two modes of operation comprising: a pulse oscillator providing pulses at a pre-set rate in one mode of operation, a feedback pulse producing means actuated by said motor to produce pulses at a rate corresponding to motor speed, a switching means, and a memory circuit, said oscillator and feedback means selectively actuating said switching means to apply power to said motor and disconnect said power, thereby controlling the amount of power applied to said motor according to the relative phase of said oscillator and feedback pulses, and said memory circuit responsive to the motor speed being below a given pre-set rate for reducing the frequency of said oscillator into substantial synchronism with the frequency of feedback pulses thereby to provide increased power to the motor and accordingly increase its speed to a given speed related to the pre-set rate of said oscillator.

6. In control system for regulating the speed of a motor, an oscillator having a preset time constant circuit, a triggering means for producing impulses and resetting said time constant means at the termination of each preset period, a bistate switching means energizable by one input to apply power to accelerate said motor, and energizable by a second input to remove said accelerating power, means for applying impulses from said oscillator to said one input, a feedback means coupled to said motor to produce feedback impulses at a frequency in proportion to motor speed, means for applying said feedback impulses to the second input, and means responsive to the application of accelerating power to said motor to disable said triggering means and to the removal of said accelerating power from said motor to enable said triggering means, whereby said oscillator is prevented from producing each impulse until a feedback impulse is produced and in the event that the time interval between succeeding feedback impulses exceeds said preset time constant, said triggering means produces its impulses substantially immediately after said feedback impulse is produced.

References Cited by the Examiner
UNITED STATES PATENTS

| | | | |
|---|---|---|---|
| 2,932,778 | 4/60 | Curtis | 318—318 X |
| 3,005,940 | 10/61 | Johnson | 318—341 X |
| 3,008,075 | 11/61 | Scott | 318—341 X |

ORIS L. RADER, *Primary Examiner.*